(12) United States Patent
Agrawal et al.

(10) Patent No.: US 8,630,446 B2
(45) Date of Patent: Jan. 14, 2014

(54) METHOD AND SYSTEM FOR DETERMINING PROJECTIONS IN NON-CENTRAL CATADIOPTRIC OPTICAL SYSTEMS

(75) Inventors: Amit K. Agrawal, Somerville, MA (US); Yuichi Taguchi, Cambridge, MA (US); Srikumar Ramalingam, Cambridge, MA (US)

(73) Assignee: Mitsubishi Electronic Research Laboratories, Inc, Cambridge, MA (US)

( * ) Notice: Subject to any disclaimer, the term of this patent is extended or adjusted under 35 U.S.C. 154(b) by 370 days.

(21) Appl. No.: 13/077,810

(22) Filed: Mar. 31, 2011

(65) Prior Publication Data

US 2012/0250977 A1    Oct. 4, 2012

(51) Int. Cl.
*G06K 9/00* (2006.01)
(52) U.S. Cl.
USPC .......................................................... 382/100
(58) Field of Classification Search
None
See application file for complete search history.

(56) References Cited

PUBLICATIONS

B.Micusik and T. Pajdla. Autocalibration & 3D reconstruction with non-central catadioptric cameras. In CVPR '04, vol. 1, pp. 58-65, Jun. 27-Jul. 2, 2004.*
J.P. Tardif, P. Sturm, and S. Roy, "Plane-Based Self-Calibration of Radial Distortion," Proc. 11th IEEE Int'l Conf. Computer Vision, Oct. 2007.*
Anh Vu et. al., "Catadioptric omnidirectional vision sensor integration for vehicle based sensing". Intelligent Transportation Systems, 2009. ITSC/ 12th international IEEE conference on. Oct. 4-7, 2009.*
Libor Spacek, A catadioptric sensor with multiple viewpoints, Robotics and Autonomous Systems, vol. 51, Issue 1, Apr. 30, 2005.*

* cited by examiner

*Primary Examiner* — Claire X Wang
*Assistant Examiner* — Thomas A James
(74) *Attorney, Agent, or Firm* — Dirk Brinkman; Gene Vinokur

(57) ABSTRACT

A three-dimensional (3D) location of a reflection point of a ray between a point in a scene (PS) and a center of projection (COP) of a camera of a catadioptric system is determined. The catadioptric system is non-central and includes the camera and a reflector, wherein a surface of the reflector is a quadric surface rotationally symmetric around an axis of symmetry. The 3D location of the reflection point is determined based on a law of reflection, an equation of the reflector, and an equation describing a reflection plane defined by the COP, the PS, and a point of intersection of a normal to the reflector at the reflection point with the axis of symmetry.

13 Claims, 4 Drawing Sheets

100

METHOD AND SYSTEM FOR DETERMINING PROJECTIONS IN NON-CENTRAL CATADIOPTRIC OPTICAL SYSTEMS

FIELD OF THE INVENTION

This invention relates generally to catadioptric optical systems, and more particularly to determining a projection in non-central catadioptric optical systems.

BACKGROUND OF THE INVENTION

A catadioptric optical system combines refraction and reflection principles, usually via lenses (dioptrics) and curved mirrors (catoptrics). The catadioptric system includes camera imaging reflectors or refractors, enabling wide field-of-view (FOV) imaging. The catadioptric systems have been used in a wide range of applications, including panoramic imaging and visualization, wide-angle reconstruction, surveillance, and mobile robot and car navigation. The catadioptric system can be central or non-central.

Central Catadioptric System

Central catadioptric systems use a camera-mirror pair arranged to enable an effective single viewpoint, i.e., all rays of light forming an image acquired by the camera sensor intersect at one point. Examples of the central catadioptric systems include a perspective camera placed on one of the foci of a hyperbolic or elliptical mirror, and an orthographic camera placed on an axis of a parabolic mirror.

Non-Central Catadioptric System

Non-central catadioptric systems are widely used in computer vision applications. Examples of non-central catadioptric systems include a perspective camera placed outside of a spherical mirror, and configurations wherein the camera is not placed on the foci of a hyperbolic or elliptical mirror. In contrast with the central catadioptric systems, in the non-central catadioptric systems, the rays do not intersect at one point. Instead, the rays may intersect along a line, or the rays may be tangent to a circle or to a more complex shape.

In a number of applications, it is important to model non-central catadioptric systems, which, in turn, requires determining a projection of a point in a scene (PS) to a center of projection (COP) of the camera of the catadioptric system. The non-central catadioptric system does not have an effective center of projection. The COP refers to the center of projection of the physical perspective camera used in a catadioptric system.

The projection maps the three-dimensional (3D) PS to a two-dimensional (2D) pixel on an image plane of the camera of the catadioptric system.

For example, if the catadioptric system includes a reflector, such as a mirror, the projection of the PS onto an image plane of the camera requires computing a path of the ray of light from the PS to the COP via mirror reflection. Thus, the point of reflection on a surface of the mirror needs to be determined. Similarly, if the catadioptric system includes the refractor, e.g., a refractive sphere, two points of refraction need to be determined to model the projection.

Analytical solutions of projections for central catadioptric systems are known. However, there is no analytical solution of projection for general non-central catadioptric systems, when a camera is placed at an arbitrary position with respect to a reflector or a refractor.

Several conventional methods approximate non-central catadioptric systems as the central catadioptric system that enables analytical solution for projection. However, those methods lead to inaccuracies such as skewed 3D estimation.

Alternative methods use iterative non-linear optimization by initializing the point of reflection or refraction using the central approximation. However, those methods are time-consuming and inappropriate initialization leads to incorrect solutions. Yet another method uses a general linear camera representation for locally approximating a non-central catadioptric camera with an affine model that allows analytical projection, but this method also introduces approximation.

Accordingly, it is desired to provide an analytical solution of the projection for non-central catadioptric systems and to determine analytically a three-dimensional (3D) location of at least one reflection point of a ray from the PS to the COP of non-central catadioptric systems.

SUMMARY OF THE INVENTION

It is an object of an invention to provide a method for determining analytically a projection for non-central catadioptric systems.

It is further an object of the invention to provide such a method that determines a reflection point of a ray between a point in a scene (PS) and a center of projection (COP) of a camera of a catadioptric system.

It is further an object of the invention to provide such a method that determines the reflection point of the catadioptric system, wherein the COP is arranged outside of the axis of symmetry of the reflector.

Some embodiments of invention are based on a realization that a reflection plane defined by the COP, the PS, and a point of intersection of a normal of a reflection point with the axis of symmetry of the reflector can be used to derive an analytical equation, which, in conjunction with a law of reflection and an equation of the reflector, can be used to determined the location of the reflection point.

One embodiment is based on another realization, that if a reflector of the catadioptric systems is rotationally symmetric, entire coordinate system can be rotated to position the COP on at least one axis. This realization enables the embodiment to reduce a degree of a forward projection equation (FPE) in one unknown, wherein the unknown is a coordinate of the reflection point. For example, one embodiment determines and solves the FPE of eights degrees.

Accordingly, one embodiment of the invention discloses a method for determining a three-dimensional (3D) location of a reflection point of a ray between a point in a scene (PS) and a center of projection (COP) of a camera of a catadioptric system, wherein the catadioptric system is non-central and includes the camera and a reflector, wherein a surface of the reflector is a quadric surface rotationally symmetric around an axis of symmetry, wherein the reflection point is a point of reflection of the ray on the surface, and wherein a configuration of the catadioptric system includes the PS and the COP identified by 3D locations. The method includes determining a first equation describing a reflection plane defined by the COP, the PS, and a point of intersection of a normal of a reflection point with the axis of symmetry; determining a second equation based on a law of reflection at the reflection point; determining a third equation as an equation of the reflector; and solving the first, the second, and the third equations to determine 3D location of the reflection point, wherein the steps of the method are performed by a processor.

The method may optionally include one or more of the following. For example, the configuration of the catadioptric system may be acquired in a first coordinate system, and the method may include rotating the first coordinate system around the axis of symmetry to a second coordinate system, such that at least one coordinate of the COP is on an axis in the second coordinate system; and mapping the 3D location of the reflection point to the first coordinate system.

For example, one variation may include constructing, based on the first, the second, and the third equations, a forward projection equation (FPE) of eight degrees in one unknown, wherein the unknown is a first coordinate of the 3D location of the reflection point in the second coordinate system; solving the FPE to determine the first coordinate; determining a second coordinate and a third coordinate of the 3D location of the reflection point in the second coordinate system based on the first coordinate and the first, the second, and the third equations to produce the 3D location of the reflection point in the second coordinate system; and mapping the 3D location of the reflection point to the first coordinate system.

Various embodiments, using the 3D location of the reflection point, may determined a pose of the reflector with respect to the camera using a bundle adjustment, a sparse 3D point in a scene and/or a dense depth map of a scene.

Another embodiment discloses a method for determining a three-dimensional (3D) location of a reflection point of a ray between a point in a scene (PS) and a center of projection (COP) of a camera of a catadioptric system, wherein the catadioptric system is non-central and includes the camera and a mirror, wherein a surface of the mirror is a quadric surface rotationally symmetric around an axis of symmetry, wherein the reflection point is a point of reflection of the ray on the surface and partitions the ray into an incoming ray and a reflected ray, and wherein the PS and the COP are identified by 3D locations. The method includes acquiring a configuration of the catadioptric system in a first coordinate system of an x axis, a y axis, and a z axis, wherein and the mirror is rotationally symmetric around the z axis, determining a rotation matrix; rotating the first coordinate system to a second coordinate system, such that an x coordinate of the COP in the second coordinate system is zero; determining, in the second coordinate system, a forward projection equation (FPE) of eight degrees in one unknown, wherein the unknown is a coordinate of the reflection point, and wherein the determining the FPE is based on an equation of the mirror, an equation describing a reflection plane defined by the COP, the PS, and a point of intersection of the normal with the axis of symmetry, and an equation describing a law of reflection; determining the 3D location of the reflection point in the second coordinate system based on the FPE; and mapping the 3D location of the reflection point to the first coordinate system using an inverse of the rotation matrix.

Yet another embodiment discloses a catadioptric system configured for determining a three-dimensional (3D) location of a reflection point of a ray between a point in a scene (PS) and a center of projection (COP) of the catadioptric system, wherein the PS and the COP are identified by 3D locations, and the catadioptric system is non-central, comprising: a reflector, wherein the reflection point is caused by a reflection of the ray on a surface of the reflector, wherein the surface is a quadric surface rotationally symmetric around an axis of symmetry; a camera arranged at a distance from the surface, wherein the COP of the catadioptric system is a COP of the camera; and a processor for determining the 3D location of the reflection point based on a law of reflection, an equation of the reflector, and an equation describing a reflection plane defined by the COP, the PS, and a point of intersection of a normal to the reflector at the reflection point with the axis of symmetry.

DETAILED DESCRIPTION OF THE PREFERRED EMBODIMENTS

Method and System Overview

Embodiments of invention are based on a realization that a three-dimensional (3D) location of a reflection point of a ray between a point in a scene (PS) and a center of projection (COP) of a camera of a catadioptric system can be determined analytically using mapping a 3D structure of the catadioptric system on a two-dimensional (2D) plane defined by the COP, the PS, and a point of intersection of a normal of a reflection point with an axis of symmetry of a reflector of the catadioptric system.

Such configurations include non-central catadioptric systems having a camera arranged at a distance from a surface of the reflector, wherein the surface is quadric and rotationally symmetric around an axis of symmetry. Importantly, for some embodiments, there is no restriction on a position of a center of projection (COP) of the camera used in the catadioptric system. For example, the COP can be arranged outside of the axis of symmetry.

Figure 1:
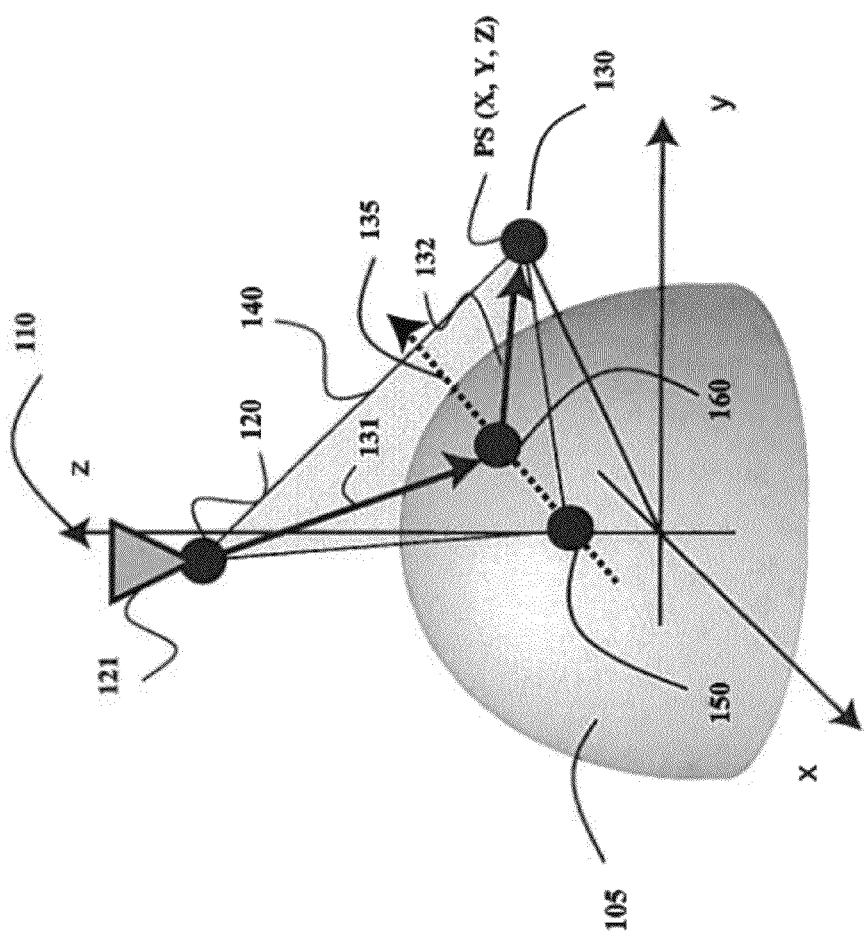
FIG. 1 is a schematic of a catadioptric system according to embodiments of an invention.

FIG. 1 shows an example of a configuration of the catadioptric system 100. The catadioptric system is non-central, and the surface of the reflector is a quadric surface rotationally symmetric around an axis of symmetry, e.g., the axis 110. The COP 120 is positioned on or off the axis of symmetry. In one embodiment, the camera is a pinhole camera.

Some embodiments determine a three-dimensional (3D) location of one reflection point 160 of a ray between a PS, e.g., the PS 130, and a COP, e.g., the COP 120, of the catadioptric system having a camera, e.g., the camera 121, arranged at a distance from a surface, e.g., the surface 105 of the optical folding element, wherein the reflection point is a point of reflection of the ray from the surface, such that the folding point partitions the ray into an incoming ray 131 and a reflected ray 132. The PS and the COP are identified by 3D locations.

Some embodiments of the invention determine a reflection plane 140 defined by the COP 120, the PS 130, and a point of intersection 150 of a normal 135 of a reflection point 160 with the axis of symmetry z 110.

For the purpose of this description, the z axis of the 3D coordinate system is the axis of symmetry, e.g., the axis of the mirror. In one embodiment, the reflector is a spherical mirror, the axis of symmetry passes through a center of the spherical mirror and the equation of the reflector is an equation of the spherical mirror.

The configuration of the catadioptric system can be acquired in a world coordinate system have an x axis, a y axis, and a z axis, wherein the COP is COP=$[c_x, c_y, c_z]^T$, wherein T is a transpose operator, wherein the PS is PS=$[X; Y, Z]^T$. The incoming ray $v_i$ is denoted as $v_i$=M−COP, wherein M denotes the reflection point, a normal n represents the normal to the mirror at the reflection point M, and the reflected ray $v_r$ is denoted as $v_r=P-M$. The quadric, rotationally symmetric mirror can be described according to $$x^2+y^2+Az^2+Bz-C=0, \quad (1)$$

wherein A, B, C are parameters for the surface of the mirror.

From the law of reflection, the following constraints can be derived:
(a) planarity: the rays $v_i$, $v_r$, and the normal n lie on the same plane; and
(b) angle constraint: an angle between the incoming ray $v_i$ and the normal n is equal to an angle between the reflected ray $v_r$ and the normal n.

These two constraints are represented in the following reflection equation $$v_r = v_i - 2n(v_i^T n)/(n^T n). \quad (2)$$

Also, the reflection point M is on the surface of the mirror, and hence, the coordinates of the reflection point satisfy the mirror Equation (1).

Figure 2:
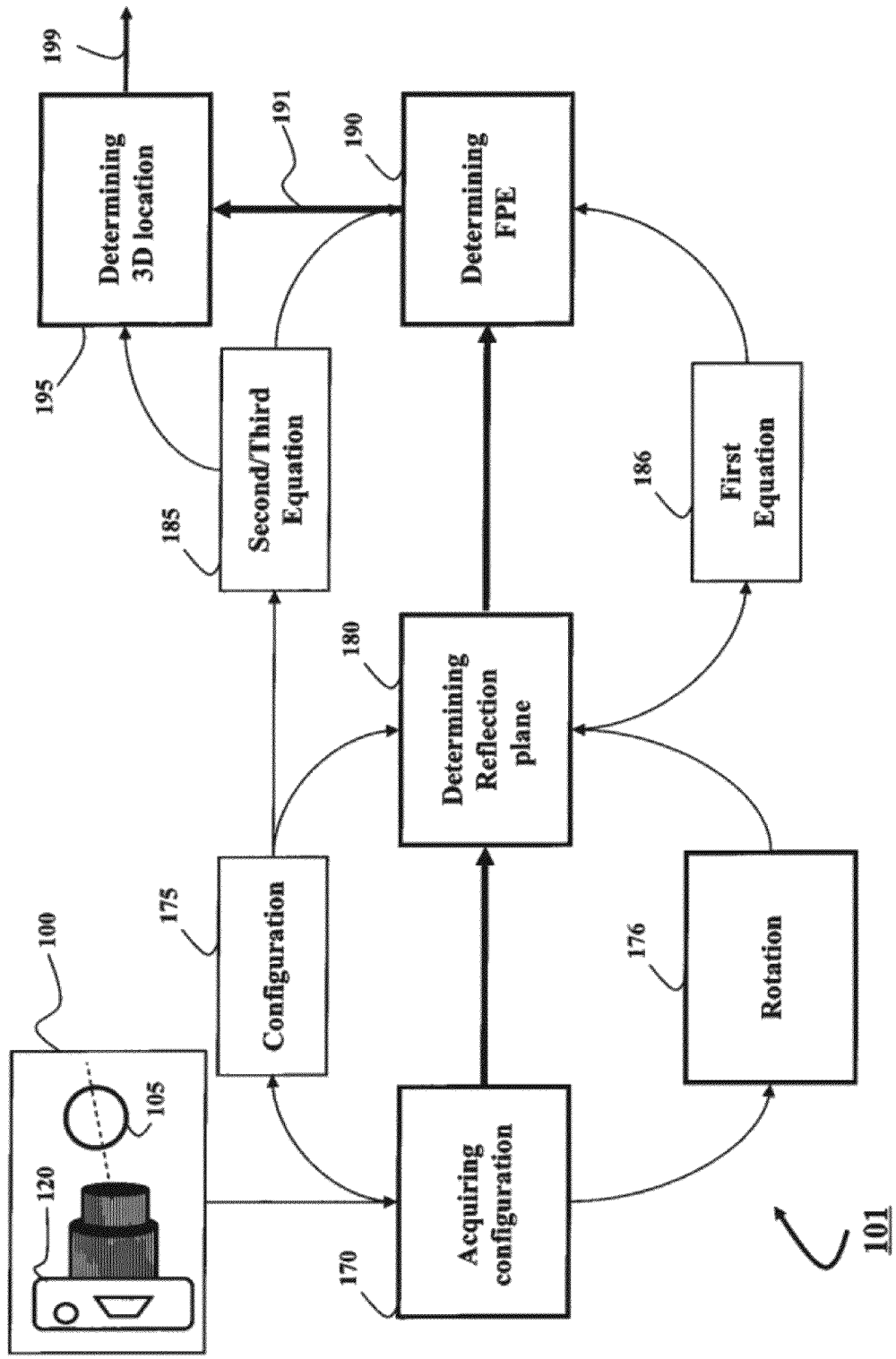
FIG. 2 is a block diagram of a method for determining a reflection point according to some embodiments of the invention.

FIG. 2 shows a block diagram of a method according embodiments of the invention. The method determines a three-dimensional (3D) location 199 of at least one reflection point of a ray between a point in a scene (PS) and a center of projection (COP) of a camera of the catadioptric system 100, according to an acquired 170 configuration 175 of the catadioptric system. In various embodiments, the configuration 175 is configuration of existing catadioptric system or a model of the catadioptric system. The steps of the method are performed by a processor 101.

The reflection plane is described with a first equation 186. A second equation and a third equation 185 are defined using, respectively, a law of reflection at the reflection point and an equation of the reflector. The first equation, the second equation, and the third equation are used to determine and solve 190 a forward projection equation (FPE) in one unknown, wherein the unknown is a first coordinate 191. Next, the 3D location 199, including the first coordinate, a second coordinate, and a third coordinate, can be determined 195 based on the first coordinate and the first, the second, and the third equations.

One embodiment of the invention is based on another realization that if the configuration of the catadioptric system is acquired in a first coordinate system, the first coordinate system can be rotated 176 to a second coordinate system, such that at least one coordinate of the COP is on an axis in the second coordinate system. In this embodiment, the first, the second, and the third equations are defined and solved in the second coordinate system, such that the 3D location of the reflection point is determined in the second coordinate system, and then mapped back to the first coordinate system.

Figure 3:
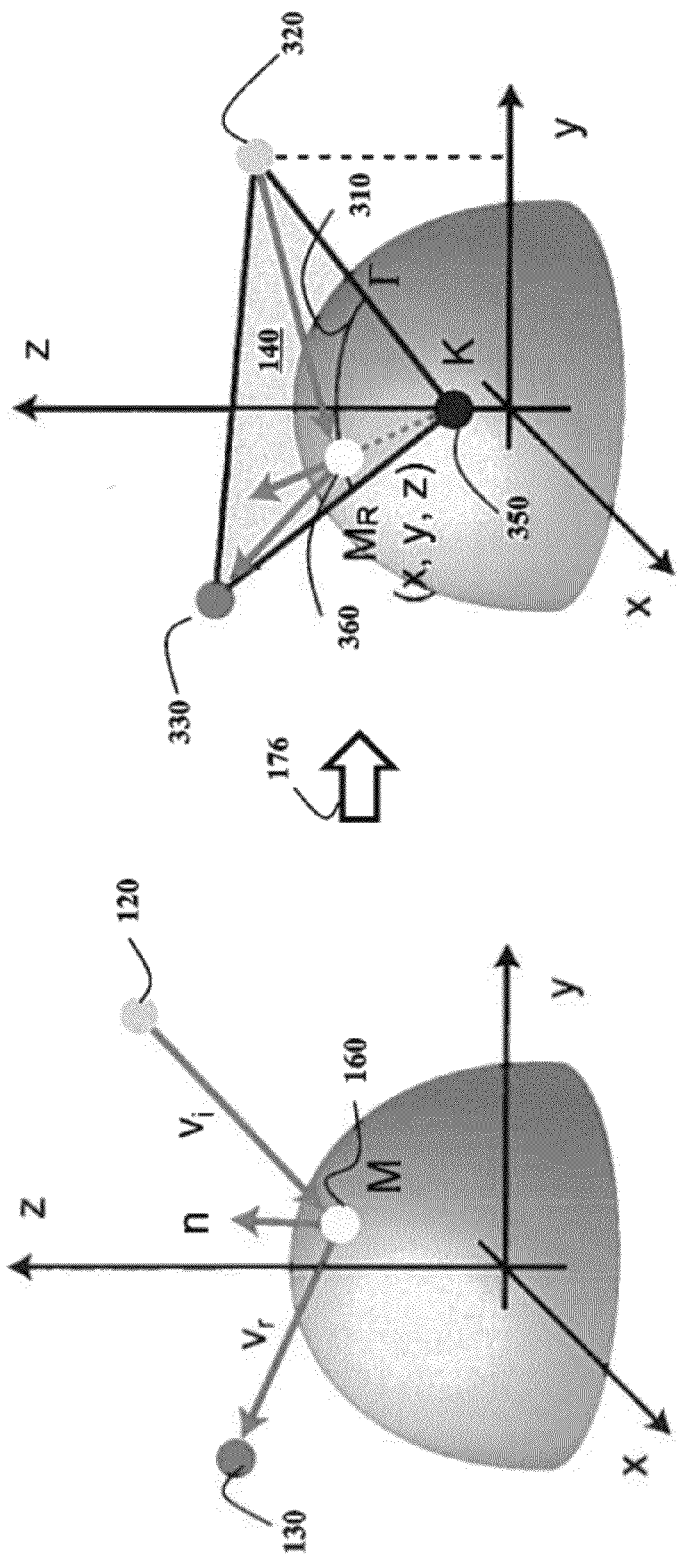
FIG. 3 is a schematic of a rotation of a coordinate system of the catadioptric system according to some embodiments of the invention.

FIG. 3 shows a schematic of the rotation 176, provided for illustration purpose only. Because the mirror is rotationally symmetric around the z axis, the entire coordinate system can be rotated around the z axis to position the COP on the y axis, as shown in FIG. 3 (right).

Some embodiments determine a rotation matrix R according to $$R = \begin{bmatrix} c_y/t & -c_x/t & 0 \\ c_x/t & c_y/t & 0 \\ 0 & 0 & 1 \end{bmatrix},$$

wherein $t=\sqrt{c_x^2+c_y^2}$, and rotate the first coordinate system to a second coordinate system, such that, e.g., an x coordinate of the COP in the second coordinate system is zero. The new coordinates of the COP 320 is given by $$COP_R = R*COP = [0, d_y, d_z]^T,$$

wherein an operator * is a multiplication.

By setting the x coordinate of the COP to zero, the degree of subsequent equations, e.g. the FPE equation, are reduced. Importantly, the rotation 176 is independent of the PS. The new coordinates of the PS 330 after the rotation is given by $PS_R = R*PS = [u,v,w]^T$. Some embodiments determine the 3D location of the reflection point $M_R$ 360 in the second coordinate system using the $COP_R$ 320 and the point of intersection 350 in the second coordinate system, and then map the 3D location of the reflection point to the first coordinate system using an inverse of the rotation matrix $R^{-1}$.

Figure 4:
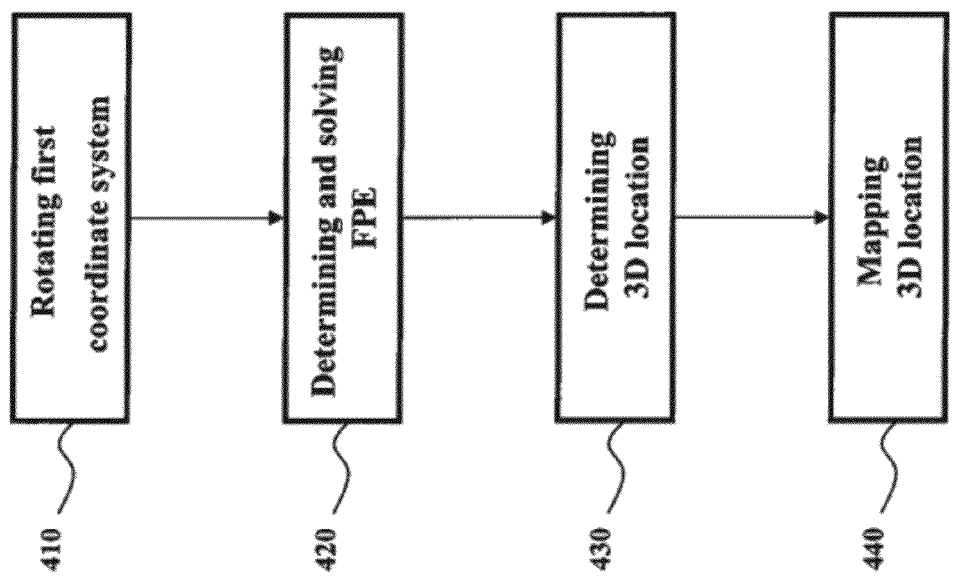
FIG. 4 is a block diagram of a method for determining a reflection point according to one embodiment of the invention.

FIG. 4 shows a flow chart of a method according to one embodiment. A step 410 includes rotating the first coordinate system in a second coordinate system, such that at least one coordinate of the COP is on an axis in the second coordinate system. A step 420 includes determining, based on the first, the second, and the third equations, a forward projection equation (FPE) of eight degrees in one unknown, wherein the unknown is a first coordinate of the 3D location of the reflection point in the second coordinate system and solving the FPE to determine the first coordinate.

A step 430 includes determining a second coordinate and a third coordinate of the 3D location of the reflection point in the second coordinate system based on the first coordinate and the first, the second, and the third equations to produce the 3D location of the reflection point in the second coordinate system. Finally, a step 440 includes mapping the 3D location of the reflection point in the second coordinate system to the first coordinate system.

Determining First Equation Based on Reflection Plane

The reflection point in the second coordinate system is $M_R = [x,y,z]^T$. The reflection plane π includes the rays $v_i$, $v_r$, and the normal n. The normal at the reflection point $M_R$ can be determined from the mirror equation as $$n = [x, y, Az+B/2]^T. \quad (3)$$

Because the mirror is rotationally symmetric around, e.g., the z axis, the normal intersects the z axis at a point $K=[0,0, z-Az-B/2]^T$, which also lies on the reflection plane. Thus, the equation of the reflection plane can be determined using the points K 350, $COP_R$ 320, and $PS_R$ 330, resulting in $$c_1(z)x + c_2(z)y + c_3(z) = 0, \quad (4)$$

wherein $$c_1(z) = (B+2Az)(d_y-v) + 2d_y(w-z) + 2v(z-d_z)$$

$$c_2(z) = u(B+2d_z-2z+2Az)$$

$$c_3(z) = ud_y(B+2Az).$$

The Equation (4) is linear for coordinates x and y. Using this Equation (4), the coordinate x can be defined in terms of the coordinates y and z according to $$x = \frac{-c_2(z)y - c_3(z)}{c_1(z)}. \quad (5)$$

Substituting the coordinate x in the mirror equation produces the first equation $IE_i$ according to $$IE_1: (c_1^2(z)+c_2^2(z))y^2 + 2c_2(z)c_3(z)y + c_3^2(z) + c_1^2(z)(Az^2+Bz-C) = 0. \quad (6)$$

The first equation is quadratic in the coordinate y, although the coefficients are functions of the coordinate z. This equation describes a curve $\Gamma$ 310, given by the intersection of the reflection plane with the mirror. The reflection point on this curve has to satisfy the angle constraint. As described below, the second equation $IE_2$ determined based on the law of reflection equation is also quadratic in the coordinate y. By eliminating y between the first $IE_1$ and the second $IE_2$ equations, a single $8^{th}$ degree equation in z, i.e., the FPE, can be determined.

Determining Second Equation Based on Law of Reflection

The reflected ray $v_r$ passes through the point in the scene, $PS_R$, yielding, $$v_r \times (PS_R - M_R) = 0 \quad (7)$$

where an operator x is a cross product. The incoming ray $v_i$ is $$v_i = M_R - COP_R = [x, y - d_y, z - d_x]^T. \quad (8)$$

The reflected ray $v^r$ can also be determined by substituting $v_i$ and n in the reflection equation (2). Then, a substitution of the reflected ray $v_r$ and values of $PS_R$ and $M_R$ in Equation (7) produces following three equations (since the cross product is in 3D)

$$E_1: k_{11}(z)x + k_{12}(z)y + k_{13}(z)xy + k_{14}(z)y^2 + k_{15}(z) = 0.$$

$$E_2: k_{21}(z)x + k_{22}(z)y + k_{23}(z)xy + k_{24}(z) = 0.$$

$$E_3: k_{31}(z)y^2 + k_{32}(z)y + k_{33}(z) = 0. \quad (9)$$

The polynomials $k_{31}, k_{32}, k_{33}$ are determined according to $$k_{31} = -4d_y(B + 2w - 2z + 2Az)$$

$$k_{32} = 4Cd_z + 4Cw - 8Cz - B^2d_z - B^2w + 4Bz^2 - 2B^2z +$$
$$4BC - 4A^2d_zz^2 - 4A^2wz^2 + 8ACz + 4Bd_yv - 4Bd_zw - 4ABz^2 +$$
$$4Ad_zz^2 + 4Awz^2 - 4ABd_zz - 4ABwz + 8Ad_yvz - 8Ad_zwz$$

$$k_{33} = 4A^2vz^3 - 4A^2d_yz^3 - 4BCv - 4Cd_zv + 4Cd_yw - 4Cd_yz + 4Cvz +$$
$$B^2d_zv + B^2d_yw + 4Ad_yz^3 + 4Bd_yz^2 - B^2d_yz - 4Avz^3 - 4Bvz^2 +$$
$$3B^2vz - 4ABd_yz^2 + 8ABvz^2 + 4Ad_zvz^2 - 4Ad_ywz^2 + 4A^2d_zvz^2 +$$
$$4A^2d_ywz^2 - 8ACvz + 4Bd_zvz - 4Bd_ywz + 4ABd_zvz + 4ABd_ywz.$$

The three Equations (9) are not independent, thus any one of them can be selected as the second equation. For example, one embodiment selects the equation $E_3$, because the equation $E_3$ is independent of x.

Forward Projection Equation

The forward projection equation (FPE) can be determined, e.g., by eliminate y from the first and the second equations to produce a single equation in only one unknown, e.g., (z). For example, one embodiment rewrites the first and the second equations as $$IE_1: k_{41}(z)y^2 + k_{42}(z)y + k_{43}(z) = 0,$$

$$IE_2: k_{31}(z)y^2 + k_{32}(z)y + k_{33}(z) = 0, \quad (10)$$

where $k_{41}(z) = c_1^2(z) + c_2^2(z)$, $k_{42}(z) = 2c_2(z)c_3(z)$ and $k_{43}(z) = c_3^2(z) + c_1^2(z)(Az^2 + Bz - C)$.

Eliminating $y^2$ produces $$y = -\frac{k_{41}(z)k_{33}(z) - k_{31}(z)k_{43}(z)}{k_{41}(z)k_{32}(z) - k_{31}(z)k_{42}}. \quad (11)$$

Next, a substitution of y into the first and the second equations produces the FPE according to $$k_{41}(z)(k_{43}(z)k_{32}^2(z) - k_{42}(z)k_{32}(z)k_{33}(z) + k_{41}(z)k_{33}^2(z)) -$$
$$k_{31}(z)(-k_{33}(z)k_{42}^2(z) + k_{43}(z)k_{32}(z)k_{42}(z) + 2k_{41}(z)k_{43}(z)k_{33}(z)) +$$
$$k_{43}^2(z)k_{31}^2(z) = 0,$$

wherein $k_{41}(z) = c_1^2(z) + c_2^2(z)$, $k_{42}(z) = 2c_2(z)c_3(z)$, and $k_{43}(z) = c_3^2(z) + c_1^2(z)(Az^2 + Bz - C) = 0$ are polynomials in z.

According to this embodiment, the FPE is a $8^{th}$ degree polynomial equation in z. The coefficients in the FPE depend on the known mirror parameters (A,B,C), the known location of $COP_R$ $(0, d_y, d_z)$ and the known location of $PS_R$ (u,v,w). If the rotation 176 is not performed, the FPE is a $12^{th}$ degree polynomial equation.

Table 1 lists the degree of FPE for various mirror shapes and camera placement. A sign "-" indicates that the central configuration may be unpractical to achieve with that particular mirror and a camera placed on the axis of symmetry of the mirror.

TABLE 1

| | | Camera Placement | | |
| --- | --- | --- | --- | --- |
| | | Off-Axis | On-Axis | |
| Mirror Shape | Parameters | Non-Central | Non-Central | Central |
| General | A, B, C | 8 | 6 | — |
| Spherical | A = 1, B = 0, C > 0 | | 4 | — |
| Elliptical | A > 0, B = 0, C > 0 | 8 | 6 | 2 |
| Hyperbolic | A < 0, B = 0, C < 0 | 8 | 6 | 2 |
| Parabolic | A = 0, C = 0 | 7 | 5 | 2 |
| Conical | A < 0, B = 0, C = 0 | 4 | 2 | — |
| Cylindrical | A = 0, B = 0, C > 0 | 4 | 2 | — |

For a general quadric and off-axis camera placement, the FPE has a degree of eight. For a parabolic mirror (A=0, C=0), the degree reduces to seven. For a cylindrical mirror polished on outside (A=0, B=0, C>0), the degree reduces to four for the off-axis camera placement. On-axis camera configuration with cylindrical mirror is practical when the mirror is polished on the inside, which reduces the degree of FPE equation to two. When the parameter A≠0, then the parameter B can be set to zero by shifting the mirror along the z axis. Table 1 also shows the degree of the FPE for conical (C=0, A<0), hyperbolic (A<0, C<0), and ellipsoidal (A>0, C>0) mirrors.

Applications of the Forward Projection Equation

Some embodiments use the forward projection equation for concurrent determining 3D points in the scene and parameters of the catadioptric system using a bundle adjustment algorithm. Determining 3D points in the scene corresponds to sparse 3D reconstruction, while determining the parameters of the catadioptric system provide corresponds to calibration of the system.

In one embodiment, the catadioptric system includes a single perspective camera imaging multiple parabolic mirrors. The internal parameters of the camera are computed separately off-line and the parameters of the shape of the mirrors are known. The bundle adjustment can be preformed by minimizing an error starting from an initial solution. The initial poses of the mirrors with respect to the camera can be obtained based on the boundaries of the mirrors in the acquired images. The initial locations of 3D points can be obtained as the center of the shortest transversal of the respective back-projection rays corresponding to the multiple mirrors. Forward projection is required to compute the error as the sum of reprojection errors in each iteration in the bundle adjustment. Hence, the analytical forward projection equation significantly reduces the processing time of the bundle adjustment compared to existing approaches using iterative forward projection.

Some embodiments consider that corresponding image points are estimated using a feature matching algorithm, such as scale-invariant feature transform (SIFT), and invariably contain outliers and false matches. Those embodiments perform the simultaneous sparse 3D reconstruction and calibration by iterating the bundle adjustment with outlier removal. After each bundle adjustment step, the 3D points whose reprojection error is greater than twice the average reprojection error are removed. Repeating the outlier removal multiple times can be efficiently done because of the forward projection equation.

Another embodiment uses the forward projection equation for reconstructing a dense depth map of a scene. Dense depth maps can be reconstructed by projecting dense 3D locations in the scene to an image via multiple mirrors, and computing a color consistency cost, e.g., sum of the squared difference of colors, among corresponding image pixels. The forward projection equation enables the dense depth reconstruction process to be performed efficiently.

EFFECT OF THE INVENTION

The embodiments of the invention advance the field of catadioptric imaging both theoretically and practically. Embodiments provide analytical equations of forward projections for a broad class of non-central catadioptric systems. Some embodiments of the invention enable an analytical determination of the reflection point in the catadioptric system, wherein the camera is positioned outside of an axis of symmetry of the mirror.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a three-dimensional (3D) location of a reflection point of a ray between a point in a scene (PS) and a center of projection (COP) of a camera of a catadioptric system, wherein the catadioptric system is non-central and includes the camera and a reflector, wherein a surface of the reflector is a quadric surface rotationally symmetric around an axis of symmetry, wherein the reflection point is a point of reflection of the ray on the surface, and wherein a configuration of the catadioptric system includes the PS and the COP identified by 3D locations, comprising the steps of:
   determining a first equation describing a reflection plane defined by the COP, the PS, and a point of intersection of a normal of a reflection point with the axis of symmetry;
   determining a second equation based on a law of reflection at the reflection point;
   determining a third equation as an equation of the reflector; and
   solving the first, the second, and the third equations to determine 3D location of the reflection point, wherein the 3D location of the reflection point includes a first coordinate, a second coordinate, and a third coordinate, and further comprising:
   constructing a forward projection equation (FPE) in one unknown from the first, the second, and the third equations, wherein the unknown is the first coordinate;
   solving the FPE to determine the first coordinate; and
   determining the second coordinate and the third coordinate based on the first coordinate and the first, the second, and the third equations, wherein the steps of the method are performed by a processor.

2. The method of claim 1, wherein the FPE is an equation of eight degrees.

3. The method of claim 1, wherein the reflector is a spherical mirror, the axis of symmetry passes through a center of the spherical mirror and the equation of the reflector is an equation of the spherical mirror.

4. The method of claim 1, wherein the configuration of the catadioptric system is acquired in a first coordinate system, further comprising:
   rotating the first coordinate system around the axis of symmetry to a second coordinate system, such that at least one coordinate of the COP is on an axis in the second coordinate system.

5. The method of claim 4, wherein the first, the second, and the third equations are defined and solved in the second coordinate system, such that the 3D location of the reflection point is determined in the second coordinate system, further comprising:
   mapping the 3D location of the reflection point to the first coordinate system.

6. The method of claim 4, further comprising:
   constructing, based on the first, the second, and the third equations, a forward projection equation (FPE) of eight degrees in one unknown, wherein the unknown is a first coordinate of the 3D location of the reflection point in the second coordinate system;
   solving the FPE to determine the first coordinate;
   determining a second coordinate and a third coordinate of the 3D location of the reflection point in the second coordinate system based on the first coordinate and the first, the second, and the third equations to produce the 3D location of the reflection point in the second coordinate system; and
   mapping the 3D location of the reflection point to the first coordinate system.

7. The method of claim 1, further comprising:
   determining, using the 3D location of the reflection point, a pose of the reflector with respect to the camera using a bundle adjustment.

8. The method of claim 1, further comprising:
   determining, using the 3D location of the reflection point, a sparse 3D point in a scene.

9. The method of claim 1, further comprising:
   determining, using the 3D location of the reflection point, a dense depth map of a scene.

10. A method for determining a three-dimensional (3D) location of a reflection point M of a ray between a point in a scene (PS) and a center of projection (COP) of a camera of a catadioptric system, wherein the catadioptric system is non-central and includes the camera and a mirror, wherein a surface of the mirror is a quadric surface rotationally symmetric around an axis of symmetry, wherein the reflection point is a point of reflection of the ray on the surface and partitions the ray into an incoming ray and a reflected ray, and wherein the PS and the COP are identified by 3D locations, comprising the steps of:

acquiring a configuration of the catadioptric system in a first coordinate system of an x axis, a y axis, and a z axis, wherein and the mirror is rotationally symmetric around the z axis, the COP is COP=$[c_x, c_y, c_z]^T$, wherein T is a transpose operator, wherein the PS is PS=$[X,Y,Z]^T$, wherein the incoming ray $v_i$ is $v_i$=M−COP, a normal n is the normal to the mirror at the reflection point M, and the reflected ray $v_r$ is $v_r$=P−M;

determining a rotation matrix R according to $$R = \begin{bmatrix} c_y/t & -c_x/t & 0 \\ c_x/t & c_y/t & 0 \\ 0 & 0 & 1 \end{bmatrix},$$

wherein t=$\sqrt{c_x^2+c_y^2}$;

rotating the first coordinate system to a second coordinate system, such that an x coordinate of the COP in the second coordinate system is zero according to R*COP=$[0,d_y,d_z]^T$, wherein an operator * is a multiplication;

determining, in the second coordinate system, a forward projection equation (FPE) of eight degrees in one unknown, wherein the unknown is a coordinate of the reflection point, and wherein the determining the FPE is based on an equation of the mirror, an equation describing a reflection plane defined by the COP, the PS, and a point of intersection of the normal n with the axis of symmetry, and an equation describing a law of reflection;

determining the 3D location of the reflection point e second coordinate system based on the FPE; and mapping the 3D location of the reflection point to the first coordinate system using an inverse of the rotation matrix $R^{-1}$.

11. The method of claim 10, further comprising:
determining a third equation as an equation of the mirror according to $x^2+y^2+Az^2+Bz-C=0$, wherein A, B, and C are parameters of the surface of the mirror;

determining a first equation describing the reflection plane according to $(c_1^2(z)+c_2^2(z))y^2+2c_2(z)c_3(z)y+c_3^2(z)+c_1^2(z)(Az^2+Bz-C)=0$, wherein z and y are coordinates of the reflection point, $c_1(z)=(B+2Az)(d_y-v)+2d_y(w-z)+2v(z-d_z)$, $c_2(z)=u(B+2d_z-2z+2Az)$, $c_3(z)=ud_y(B+2Az)$.

wherein u, v, and w are coordinates of the PS in the second coordinate system, $[u, v, w]^T$=R* PS;

determining a second equation based on law of reflection according to $k_{31}(z)y^2+k_{32}(z)y+k_{33}(z)=0$, wherein polynomials $k_{31}$, $k_{32}$, $k_{33}$ determined according to $$k_{31} = -4d_y(B + 2w - 2z + 2Az)$$

$$k_{32} = 4Cd_z + 4Cw - 8Cz - B^2d_z - B^2w + 4Bz^2 - 2B^2z +$$
$$4BC - 4A^2d_zz^2 - 4A^2wz^2 + 8ACz + 4Bd_yv - 4Bd_zw - 4ABz^2 +$$
$$4Ad_zz^2 + 4Awz^2 - 4ABd_zz - 4ABwz + 8Ad_yvz - 8Ad_zwz$$

$$k_{33} = 4A^2vz^3 - 4A^2d_yz^3 - 4BCv - 4Cd_zv + 4Cd_yw - 4Cd_yz + 4Cvz +$$
$$B^2d_zv + B^2d_yw + 4Ad_yz^3 + 4Bd_yz^2 - B^2d_yz - 4Avz^3 - 4Bvz^2 +$$
$$3B^2vz - 4ABd_yz^2 + 8ABvz^2 + 4Ad_zvz^2 - 4Ad_ywz^2 + 4A^2d_zvz^2 +$$
$$4A^2d_ywz^2 - 8ACvz + 4Bd_zvz - 4Bd_ywz + 4ABd_zvz + 4ABd_ywz;$$

and determining the FPE based on the first equation, the second equation, and the third equation.

12. The method of claim 11, further comprising:
determining the FPE according to $$k_{41}(z)(k_{43}(z)k_{32}^2(z) - k_{42}(z)k_{32}(z)k_{33}(z) + k_{41}(z)k_{33}^2(z)) -$$
$$k_{31}(z)(-k_{33}(z)k_{42}^2(z) + k_{43}(z)k_{32}(z)k_{42}(z) + 2k_{41}(z)k_{43}(z)k_{33}(z)) +$$
$$k_{43}^2(z)k_{31}^2(z) = 0,$$

wherein $k_{41}(z) = c_1^2(z) + c_2^2(z)$, $k_{42}(z) = 2c_2(z)c_3(z)$, and $k_{43}(z) = c_3^2(z) + c_1^2(z)(Az^2 + Bz - C) = 0$ are polynomials in z.

13. The method of claim 10, wherein a shape of the mirror is selected from a group consisting of: a spherical, an elliptical, a hyperbolic, a parabolic, a conical, and a cylindrical shape.

* * * * *